J. MILLER, Sr.
SOIL PIPE CONNECTION.
APPLICATION FILED NOV. 8, 1912.
1,134,400.
Patented Apr. 6, 1915.
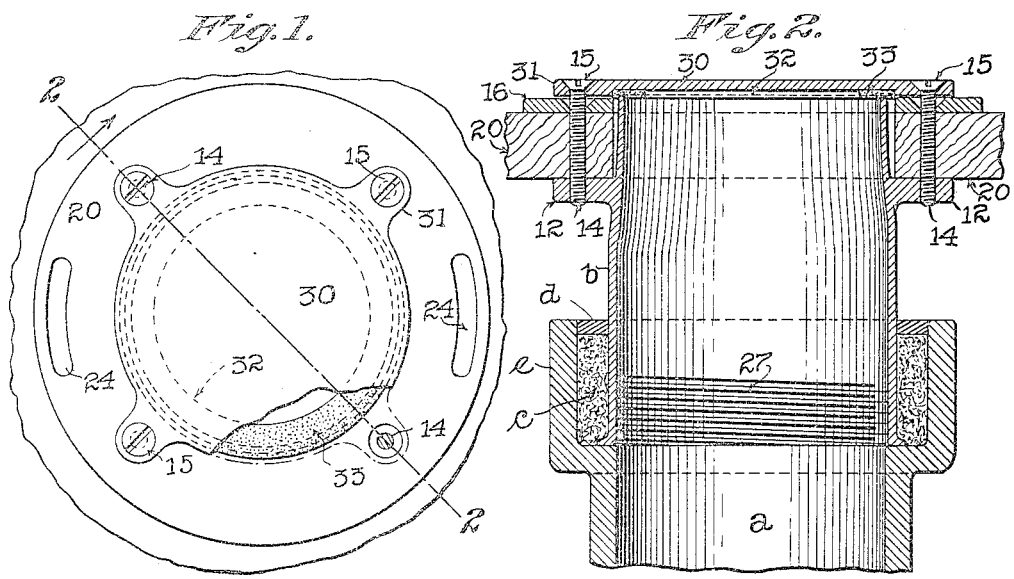
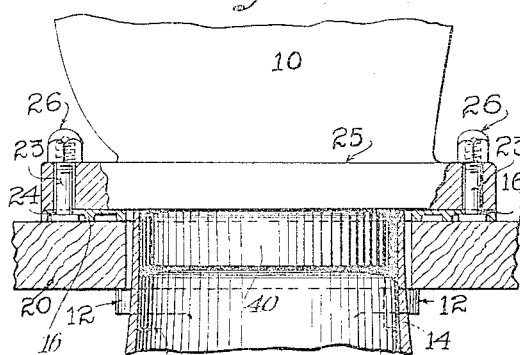
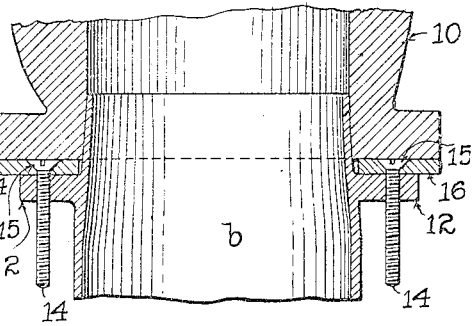
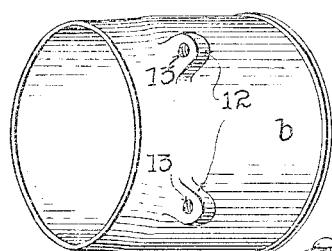
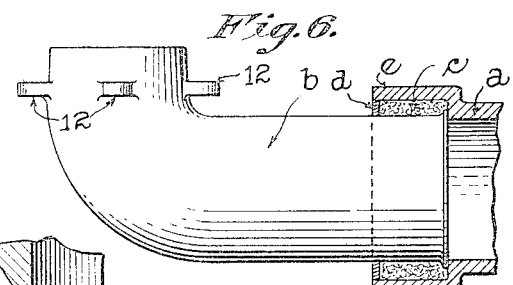
Witnesses:
M. G. Crogin
J. Murphy
Inventor,
John Miller Sr.
by Jas. H. Churchill
Atty.

UNITED STATES PATENT OFFICE.

JOHN MILLER, SR., OF BOSTON, MASSACHUSETTS, ASSIGNOR OF ONE-FOURTH TO JOHN J. BARKER, OF ARLINGTON HEIGHTS, MASSACHUSETTS, AND ONE-FOURTH TO ERNEST BLASSER AND ONE-FOURTH TO WALTER C. SARGEANT, BOTH OF BOSTON, MASSACHUSETTS.

SOIL-PIPE CONNECTION.

1,134,400.   Specification of Letters Patent.   Patented Apr. 6, 1915.

Application filed November 8, 1912. Serial No. 730,154.

*To all whom it may concern:*

Be it known that I, JOHN MILLER, Sr., a citizen of the United States, residing in Boston, county of Suffolk, and State of Massachusetts, have invented an Improvement in Soil-Pipe Connections, of which the following description, in connection with the accompanying drawings, is a specification, like characters on the drawings representing like parts.

This invention relates to a soil pipe connection and has for its object to provide a connection by means of which the toilet or closet bowl is firmly connected with the soil pipe, so as to avoid movement of the bowl independently of the soil pipe and thus prevent leakage of the soil pipe connection from this source. To this end, the soil pipe has secured to it a ferrule, having coöperating with it a floor flange, which is mechanically fastened to the ferrule and to which the bowl is also mechanically fastened.

The invention further has for its object to provide the ferrule with a testing cap, which is mechanically secured to the ferrule as will be described.

These and other features of this invention will be pointed out in the claims at the end of this specification.

Figure 1 is a plan view of a soil pipe connection embodying this invention. Fig. 2, a vertical section on the line 2—2 Fig. 1. Fig. 3, partial section and elevation showing the bowl connected with the ferrule shown in Fig. 2. Fig. 4, a modification of the connection. Fig. 5, a detail of the ferrule shown in Fig. 2, Fig. 6, a modification to be referred to and Fig. 7, a detail in section of the bowl and ferrule shown in Fig. 3.

Referring to the drawing, *a* represents a soil pipe of well known construction such as now commonly used, and *b* is a metal pipe section commonly known as a ferrule, which is secured to the soil pipe so as to practically form part thereof, and in Fig. 2, the ferrule is shown as secured gas tight to the soil pipe by a calking material *c* and lead *d*, which are interposed between the ferrule and the hub *e* of the soil pipe.

The present invention has for one of its objects to provide for mechanically connecting the toilet bowl 10 with the soil pipe *a*, whereby movement of the bowl with relation to the soil pipe is avoided and leakage between the bowl and soil pipe is prevented.

In the present instance I have shown one construction for mechanically connecting the toilet bowl 10 with the soil pipe *a*, and to this end, the ferrule *b* is provided with a plurality of lugs or ears 12, which extend outwardly from the ferrule below the upper end thereof. Each of the lugs 12 is provided with a threaded hole 13 through it, with which coöperates the threaded shank 14 of a screw 15, which is passed down through a hole in a metal ring 16 of larger diameter than the ferrule, so as to fit over the upper end of the same. The ring 16 is commonly referred to as the floor flange and rests upon the floor boards 20, which support the toilet or closet bowl 10, see Fig. 3, and which are bored or cut away for the passage of the screws 15.

The toilet bowl 10 is fastened to the flange or ring 16 by bolts 23, which pass up through slots 24 in the flange 16, see Figs. 1 and 3, and through the base 25 of the bowl 10 and are provided above the latter with nuts 26.

By reference to Figs. 2 and 3, it will be seen that the flange 16 is secured to the ferrule *b* by the screws 15, and that the bowl 10 is secured to the flange 16 by the bolts 23, consequently the bowl is positively and mechanically joined to the ferrule, which practically forms part of the soil pipe. By thus mechanically connecting the bowl with the ferrule, tilting movement of the bowl with relation to ferrule is avoided and leakage between the ferrule and the bowl is prevented.

In Figs. 2 and 3, the flange or ring 16 is shown as resting on the floor boards 20 and substantially flush with the upper end of the ferrule, in which case the connection between the ferrule and the bowl is made on the inside of the ferrule and is known as an inside connection, the bowl being provided with a skirt or cylindrical extension (see Figs. 3 and 7), which fits into the upper end of the ferrule, whereas, in Fig. 4, the flange or ring 16 is shown resting on the lugs 12, and the connection of the bowl with the ferrule is made on the outside of the latter. For this purpose the screw threads on the shank 14 of the screws extend up to the heads of said screws, so as to firmly fasten the flange to the ferrule, and the bowl used for the outside connection is not provided with the skirt 40. In practice, situations arise in which the floor boards are omitted, as, for instance, when the skirt 40 on the inside of the bowl is not deep enough to extend into the ferrule, if the floor boards are used. So also, the floor boards beneath the base of the bowl may be omitted if desired or required in a particular job, and the base of the bowl is then capable of resting on the ring 16, which rests directly on the lugs 12. It will be understood that both types of bowls are of standard make and are in common use, one type being used when an inside connection is to be made and the other when an outside connection is to be made.

In the present instance, the ferrule is shown as secured within the hub of a soil pipe by calking it thereto, but it is not desired to limit the invention in this respect, as the ferrule may be provided with screw threads 27 to enable it to be used with a soil pipe provided with screw threads.

In plumbing a building, it is the common practice to test the joints between the ferrules and the soil pipes before the bowls are connected with the soil pipes, and the practice now in vogue is to close the ferrules with rubber plugs, which are forced or driven into them. These rubber plugs are more or less expensive and are oftentimes lost and stolen, which is a matter of considerable expense, as some jobs require as many as 25 or more plugs for each building.

The present invention further has for its object to provide a substitute for these plugs, which can be secured to the ferrule by the screws 15. To this end, I provide a metal cap 30 having lugs 31, provided with holes through which the screws 15 are passed and engaged with the threaded holes 13 in the lugs 12 on the ferrule, as represented in Fig. 2. The cap 30 may be provided with a recess 32 for the reception of a suitable washer 33, which is pressed gas tight onto the upper end of the ferrule, when the screws 15 are set up. These caps can be made of malleable iron and at a very small cost, so that if misplaced the loss is negligible and they are not valuable enough to steal.

Another advantage of securing the flange 16 to the lugs on the ferrule by the screws 15, is, that if the ferrule should be tilted or canted slightly while it is being calked in the soil pipe, it can be easily straightened by employing a piece of floor board to rest the flange upon while the screws 15 are set up, and the setting up of the screws will draw the ferrule into a plumb position, and if a leak should be started between the ferrule and the soil pipe, it is a comparatively easy matter to repack the ferrule. In Fig. 2, the ferrule is shown as a straight piece of pipe, but it can be made in elbow form as shown in Fig. 6, if desired, and used with a horizontally extended branch of the soil pipe.

In the present instance, the ferrule is provided with a plurality of lugs located in substantially the same plane, but it is evident that a single annular ring or flange having a plurality of threaded holes 13 may be used instead of the lugs. Furthermore, one method of mechanically securing the bowl to the ferrule is herein shown but it is not desired to limit the invention to the particular construction shown. A gas tight joint is made between the bowl and the ferrule by putty or cement as now commonly practised.

It will be observed that the portion of the ferrule above the lugs 12 is not provided with a flange externally and consequently the ferrule is capable of making what is known as an outside connection as well as an inside connection, for the unflanged exterior surface of the upper end of the ferrule is capable of being readily inserted into a pipe as shown in Fig. 4 to make a fluid-tight connection therewith as well as to have a pipe inserted into it.

Claims:

1. In combination, a soil pipe, a ferrule secured thereto and provided with lugs extended therefrom below the upper edge of said ferrule and above the soil pipe, a floor flange separate from said ferrule but coöperating with and movable on the portion thereof above said lugs, means for mechanically fastening said floor flange with said lugs, a bowl, and means for mechanically securing said bowl to said flange, substantially as described.

2. In combination, a ferrule provided below its upper edge with an outwardly extended device, a floor flange separate from said ferrule but coöperating with and movable on the portion thereof above said device, and means for mechanically securing said floor flange to said device.

In testimony whereof, I have signed my name to this specification in the presence of two subscribing witnesses.

JOHN MILLER, Sr.

Witnesses:
Jas. H. Churchill,
J. Murphy.

Copies of this patent may be obtained for five cents each, by addressing the "Commissioner of Patents, Washington, D. C."